Dec. 20, 1932.                J. L. GISH                1,891,533
                                VALVE
                          Filed Jan. 15, 1930
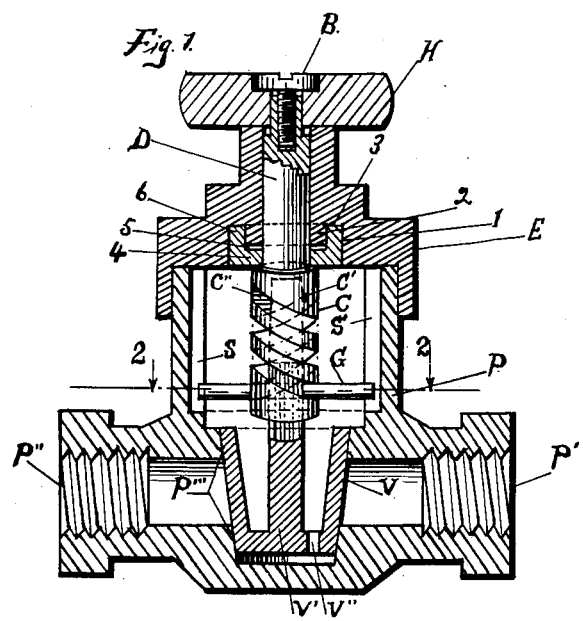
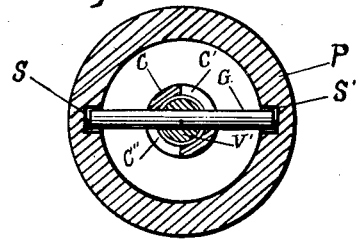
INVENTOR.
BY    John L. Gish
ATTORNEY.

Patented Dec. 20, 1932

1,891,533

UNITED STATES PATENT OFFICE

JOHN L. GISH, OF SOUTH BEND, INDIANA

VALVE

Application filed January 15, 1930. Serial No. 420,985.

My invention relates to improvements in a valve in which a non-rising rotatable operating spindle, housed in a casing, operates in conjunction with a hollow plug-type reciprocating valve; and the objects of my improvements are, first, to provide the operating spindle at its inner end with a spirally slotted hollow cylinder shaped section; second, to provide means for a vertical stable lift of said valve, and third, to provide a hollow plug-type reciprocating valve having its valve-stem projecting perpendicularly from its bottom wall.

I attain these objects by the mechanism illustrated in the accompanying drawing, in which—Figure 1 is a vertical section of my improved device showing the said reciprocating valve in the closed position, and firmly seated upon its valve seat.

Figure 2 is a horizontal section on the line 2—2 of Figure 1.

Like letters and figures of reference refer to like parts, in the several figures.

In Figure 1—P is the valve body provided with an inlet opening P' an outlet opening P'' and a suitable valve seat P'''. A removable bonnet E is fastened, pressure tight, to valve body P. Member E is provided at its inner end with an outer ring 1 and an inner ring 2 of unequal height with an annular groove 3 between said rings. Member D is a non-rising rotatable operating spindle housed within part E.

The spindle D is provided at its outer end with an operating wheel H. Spindle D is also provided with a gland disc 4, having a ring 6 and an annular groove 5; said annular groove 3 is adapted to engage ring 6, and annular groove 5 is adapted to receive ring 2, thereby forming an unpacked, but pressure tight, operating bearing between members D and E.

Spindle D is further provided at its inner end with a hollow cylinder shaped section C, section C being provided with two spiral slots C' and C''. Member V is a hollow plug-type reciprocating valve provided with valve stem V' projecting perpendicularly from its bottom wall. Member V is also provided with an equalizing port V''. Member G is a guide arm adapted to pass through and engage, in a loose running fit, the spiral slots C' and C'' and is attached to the valve stem V' within section C. The parallel vertical grooves S and S' are arranged diametrically opposite to each other in part P and adapted to engage, in a loose running fit, the respective ends of said guide arm G, thereby preventing rotation of valve V. Draw bolt B is adapted to assemble parts E D and H in their respective operative positions.

The improved device operates as follows:—

First, the operating handle H is turned, thereby rotating the spindle D and thereby actuating the spirally slotted hollow cylinder section C which in turn cooperates with the guide arm G. The guide arm G having its respective ends engaged, in a loose running fit, in the vertical grooves S and S' the valve V is prevented from rotating, and thereby imparts a stable vertical lift to the valve V as the guide arm G follows the curve or lead of said spiral slots C' and C'' when the spindle D is operated.

What I do claim as my invention, and desire to secure by Letters Patent is:—

In a valve, a valve body having a passage-way therethrough and a valve seat therein, said valve body being provided with two parallel diametrically arranged vertical grooves extending from near the top line of the valve seat therein to the top line of the said valve body; a hollow plug-type reciprocating valve adapted to engage said seat for controlling said passage-way, said valve having a valve stem projecting perpendicularly from its bottom wall; a removable spindle-bearing bonnet, a non-rising operating spindle within said bonnet, said spindle at its outer end being provided with an operating handle, said spindle at its inner end provided with an integral spirally slotted hollow cylinder shaped section adapted to receive said valve stem in such a manner as to admit of a reciprocating movement within the said hollow cylinder shaped section forming an axial guide for said valve whereby said valve is kept in its working vertical alinement with its valve seat, said valve stem being provided with a guide arm adapted to pass through and engage in a loose running fit the said spiral slots in the said hollow cylinder section, said guide arm at its ends adapted to engage, in a loose running fit, the said vertical grooves in said valve body, thereby forming means to prevent rotation of said valve and impart a stable vertical lift to the said valve, as the said guide arm follows the curve or lead of said spiral slots, when the operating spindle is operated to open the said valve, and a draw bolt adapted to assemble the parts in their respective operative positions.

JOHN L. GISH.